Patented Mar. 17, 1925.

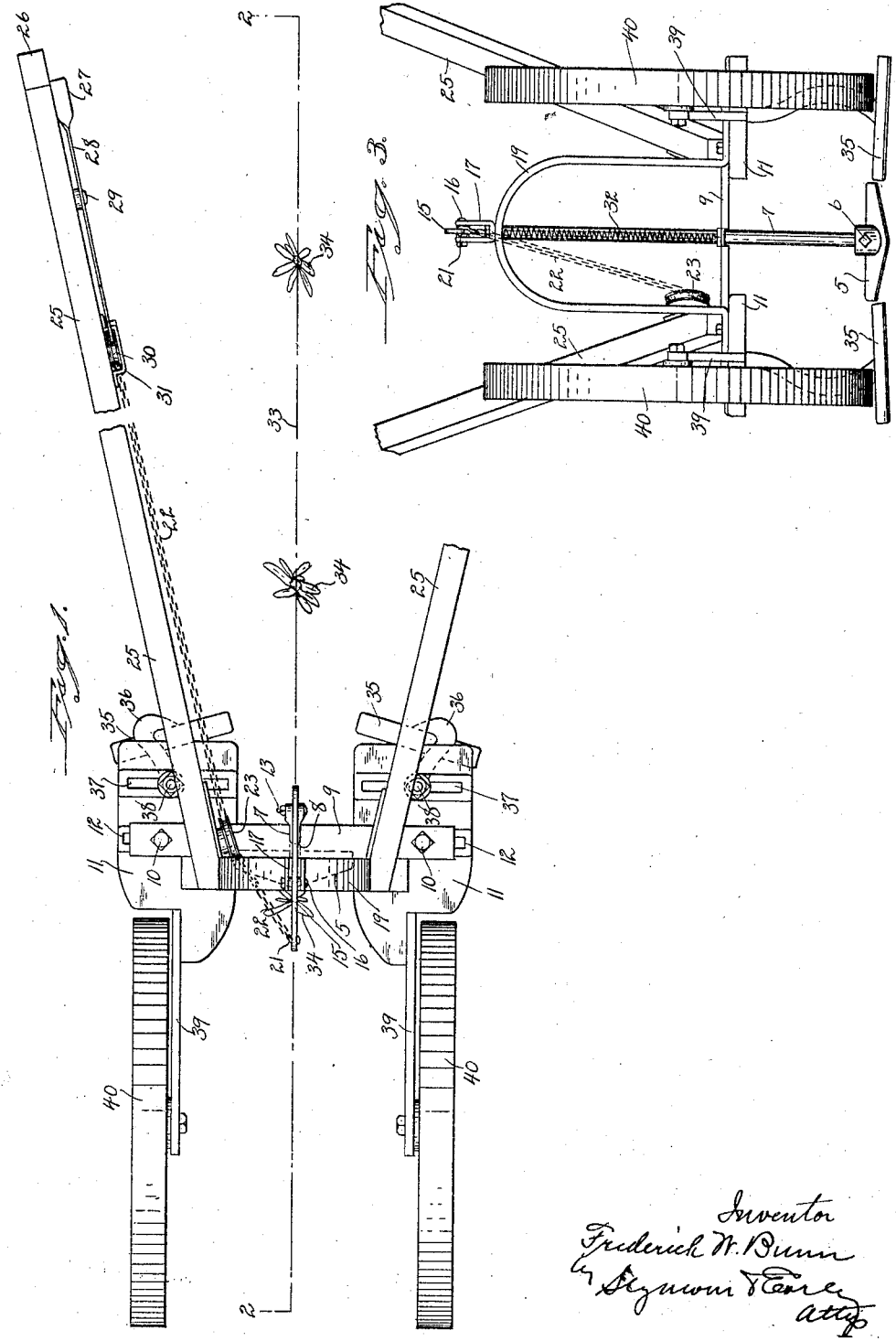

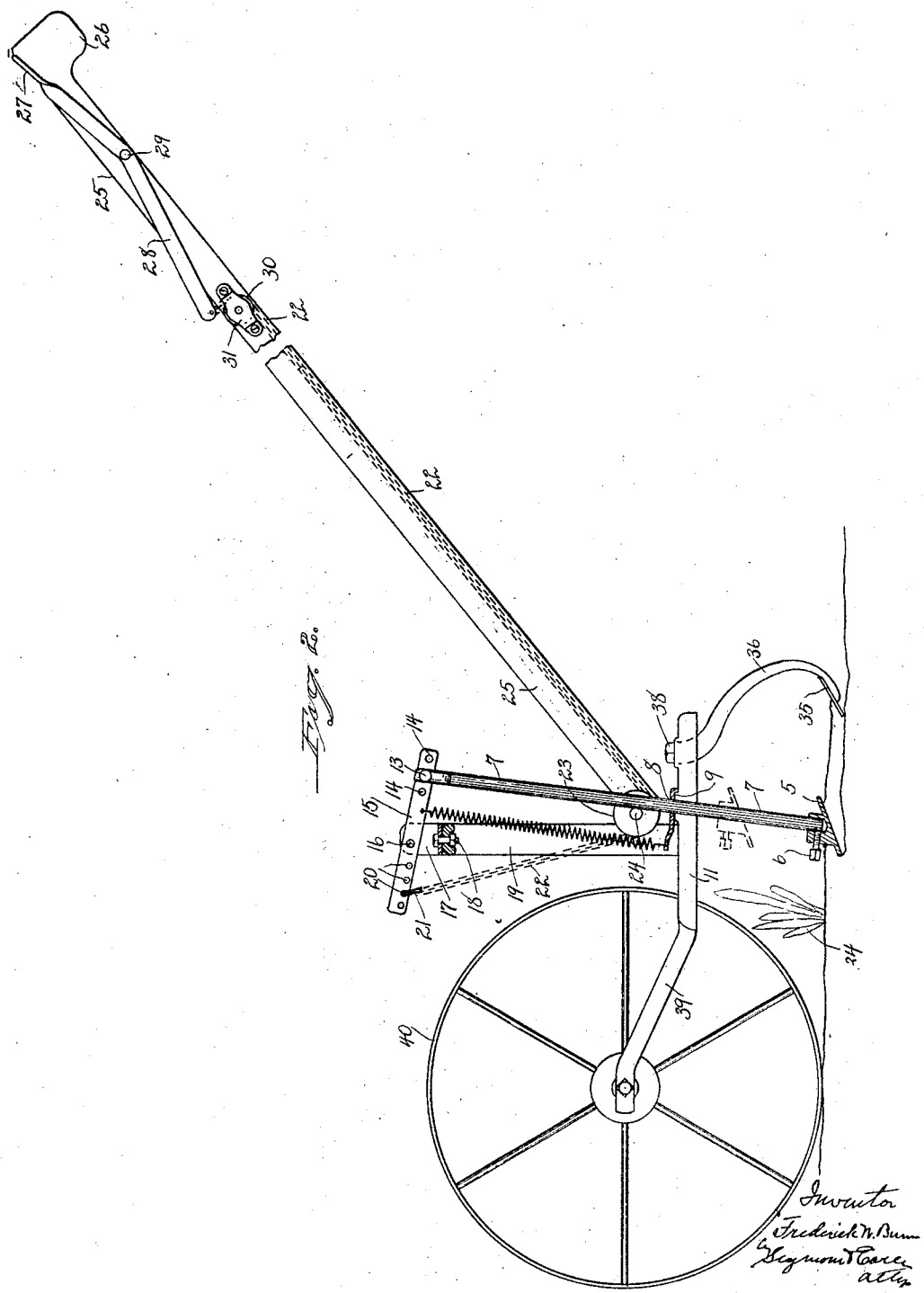

1,530,106

UNITED STATES PATENT OFFICE.

FREDERICK W. BUNN, OF BRISTOL, CONNECTICUT.

CULTIVATOR.

Application filed June 13, 1922. Serial No. 567,922.

*To all whom it may concern:*

Be it known that I, FREDERICK W. BUNN, a citizen of the United States, residing at Bristol, in the county of Hartford and State of Connecticut, have invented a new and useful Improvement in Cultivators; and I do hereby declare the following, when taken in connection with the accompanying drawings and the characters of reference marked thereon, to be a full, clear, and exact description of the same, and which said drawings constitute part of this application, and represent, in—

Fig. 1, a broken plan view of one form which a wheel-cultivator, constructed in accordance with my invention, may assume.

Fig. 2, a view in vertical central section on the line 2—2 of Fig. 1.

Fig. 3, a broken view thereof in front elevation.

My invention relates to an improvement in wheel-cultivators and is primarily designed for hand or man-power cultivators, but not so limited, the object being to produce a simple, durable and efficient cultivator constructed with particular reference to cultivating the soil lying between the individual plants of a row, as well as that on either side thereof.

With these ends in view, my invention consists in a wheel-cultivator having two tools positioned to cultivate the soil on both sides of a row of plants, a movable tool positioned to cultivate the soil between the individual plants, and means for lifting the movable tool at pleasure to clear the plants, whereby the soil is cultivated between the plants as well as alongside the plants.

My invention further consists in a wheel-cultivator having certain details of construction and combinations of parts as will be hereinafter described and particularly pointed out in the claim.

In carrying out my invention, as herein shown, I employ a supplemental tool 5 which may be of any one of the different forms of tools employed in cultivators in general use. This tool is removably secured by a set-screw 6 to the lower end of a vertically-movable post 7 having sliding bearing in a central opening 8 in a transversely-arranged horizontal bar 9 secured at its ends by bolts 10 to the two complementary horizontal tool-mounting plates 11 of the cultivator, the bolts 10 passing through transversely-arranged slots 12 in the said plates. The projecting upper end of the said post 7 carries a bolt 13 passing through one of a series of bolt-holes 14 in the rear end of a bar 15 rocking on a bolt 16 in a bracket 17 fastened by a bolt 18 to the center of the arched top of an upstanding bowed frame or yoke 19, the straight sides of which have their lower ends secured in the usual manner to the inner edges of the mounting-plates 11 and serving to unite the same. The forward end of the rocking bar 15 is formed with a series of holes 20, one of which receives a hook 21 on the end of an operating-chain 22 running downward and under a pulley 23 mounted on a stud 24 projecting from the inner face of the lower end of the right-hand handle-bar 25, the outer end of which is formed with a grip 26, adjacent to which is located the handle 27 of a lifting-lever 28 hung on a stud 29 and having its inner end connected with the outer end of the chain 22, which also runs over a small pulley 30 located within a bracket 31 secured to the inner face of the said handle. A spring 32 connected at its upper end with the rocking-bar 15 and at its lower end with the horizontal bar 9, exerts a constant effort to depress the vertically-movable post 7, and so lower the supplemental tool 5 into position for penetrating the soil. The said tool 5 as thus constructed and arranged is positioned substantially in line with the central longitudinal axis of the cultivator, this axis being represented for my present purpose by the line 33 which is virtually coincident with the expected line of travel of the cultivator itself, and with the row of plants 34 spaced apart in the customary manner of planting in rows.

As herein shown, the said supplemental tool 5 is flanked on either side by normally fixed but adjustable, interchangeable, complementary tools 35 of any approved form and construction, and having bowed shanks 36 respectively passed upward through transverse slots 37 near the rear edges of the two mounting-plates 11 and held in place by nuts 38. The said plates 11 are formed with forwardly-extending arms 39 carrying wheels 40 which travel on opposite sides of the line 33 aforesaid, and hence alongside and parallel with the row of plants 34. The left-hand handle-bar 25 corresponds to the right-hand handle-bar and is similarly secured to the bowed frame or yoke 19.

In the use of my improved cultivator, the fixed tools 35, whatever their form, cultivate the soil on either side of the row of plants in the usual manner of such tools, while the centrally-arranged, vertically-movable supplemental tool 5 cultivates the soil between the plants, which are successively cleared as the cultivator is pushed forward, by lifting the said tool high enough to clear them, or at least their root systems, this being done by the operator, who, with his hand upon the grip 26 of the right-hand handle-bar 25, manipulates the lifting-lever 28 through its handle 27. When he removes, or lets up on, the pressure applied to the lever 28, the spring 32 asserts itself to bring the tool 5 in the soil again, and so on. Since the tool 5 is entirely under the control of the operator, it makes no difference whether the plants are uniformly spaced or not, though uniformity in that respect makes the action of the machine easier and more regular. The control of the supplemental tool 5 is thus placed entirely within the right-hand of the operator and provision made for cultivating the soil between the individual plants of a row, as well as the soil alongside thereof. In a word, my improved cultivator provides for "jumping" a cultivator tool over the individual plants in a row, thus supplementing the fixed cultivator tools heretofore used in wheel-cultivators of the type to which my invention pertains, with the effect of cultivating the soil on all sides of the individual plants, whereas, heretofore, it has been necessary to cultivate the soil between the individual plants of a row by hand-held tools.

While I have shown my improvement as applied to a man-power cultivator, my invention is applicable to power-propelled machines.

I claim:

In a wheel-cultivator operable by hand-power, the combination with a frame having a vertical, transversely-arranged yoke-member, of two wheels carrying the forward end of the said frame and located in front of the said yoke-member, tools carried by the said frame and suitably spaced apart to cultivate the soil on either side of a row of plants, two diverging propelling handles attached to the frame and extending rearwardly therefrom, a non-rotable, substantially-vertical post bearing in the said frame and moving therein in a rectilinear path, a supplemental cultivating tool mounted upon the lower end of the said post, a hand-lever mounted upon the rear end of one of the said handles for lifting the supplemental tool, a rocking-lever mounted upon the upper end of the said yoke and connected at one end with the upper end of the said post, and a flexible connection between the said hand-lever and the opposite end of the said rocking-lever, whereby, by operating the hand-lever, the supplemental tool may be lifted in a rectilinear path at pleasure above the plants without disturbing the other tools.

In testimony whereof, I have signed this specification in the presence of two subscribing witnesses.

FREDERICK W. BUNN.

Witnesses:
W. C. H. MASON,
WILLIAM L. NEUBAUER.